May 15, 1945.　　　V. S. MAKAROFF　　　2,375,858
AIRPLANE
Filed June 20, 1942
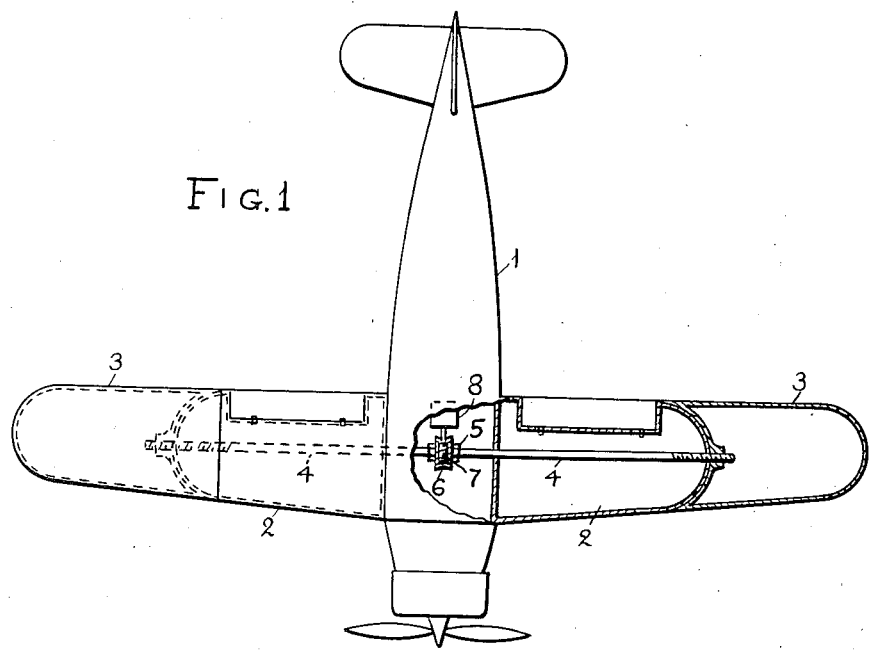
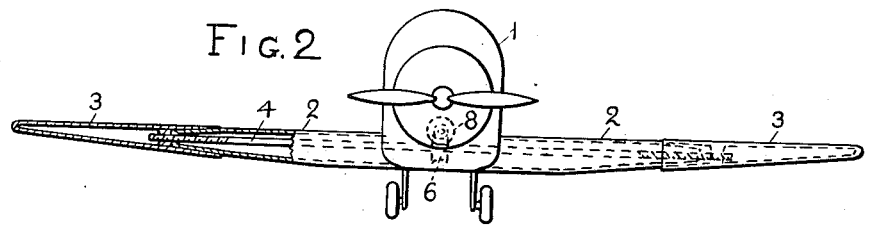
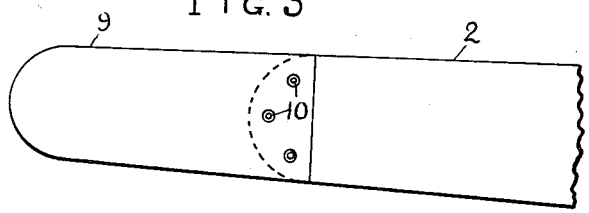
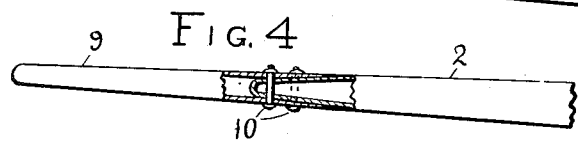
VADIM S. MAKAROFF
INVENTOR
BY John P. Nikonow
ATTORNEY Patented May 15, 1945

2,375,858

UNITED STATES PATENT OFFICE 2,375,858

AIRPLANE

Vadim S. Makaroff, New York, N. Y.

Original application February 27, 1940, Serial No. 320,999. Divided and this application June 20, 1942, Serial No. 447,785

2 Claims. (Cl. 244—43)

My invention relates to airplanes and has particular reference to airplanes with removable supplementary wings.

This is a divisional application of my application Serial No. 320,999, filed February 27, 1940.

In my United States patent, No. 2,277,242, I disclosed an airplane with supplementary wings which are placed in operation for taking off under full load and for long distance flights at a reduced speed, the wings being provided with a mechanism for their release by the pilot or airplane crew when they are no longer needed, the released wings being allowed to fall or float away.

Under certain conditions, however, it is not desirable to provide separate auxiliary wings.

Under such conditions, instead of converting an airplane into a biplane by the attachment of auxiliary wings, I provide an additional lifting surface by temporarily attaching extensions to the main wings of the airplane. Such extensions can be unbolted or unfastened when the airplane completes its long distance flight.

My invention is more fully described in the accompanying specification and claims in which:

Fig. 1 is a top plan view of my airplane partly in section;

Fig. 2 is a front view of the same in section;

Fig. 3 is a fractional plan view of an extension wing;

Fig. 4 is an edge view of the same.

My airplane is shown in one of its modifications in Figs. 1 and 2. It represents a monoplane with a body or fuselage 1 and main wings 2 designed for flying at a high speed so that its wing surface is relatively small. In order to enable the airplane to have a large radius of operation at a cruising speed or to increase its load carrying capacity at take off, I provide auxiliary wing tips or extensions 3, having hollow sockets at the inner ends, fitting tightly over the tips of the wings 2. The auxiliary wings are threaded inside for long screws 4.

The screws are joined in the middle by a coupling or cylinder 5 with a worm gear 6 engaged by a worm 7 operated by an electric motor 8. The screws have a right and left thread so that when the motor is turning, both screws will be withdrawn from their nuts in the extensions 3.

In a modified construction shown in Figs. 3 and 4, the wing tips 9 are fastened to the wings 2 by bolts 10, preferably with round heads to reduce air friction, or with the heads and nuts sunk into the body of the tips. The auxiliary wing extensions are attached to the wings when a fast fighter plane must be flown a long distance, as from one country to another, or from a place of manufacture to the field of action. Upon arrival at its destination the airplane is freed from the auxiliary wings and again becomes a fast fighter.

The wing extensions are so made that their surfaces smoothly merge with the surfaces of the main wings so that the combined structure represents large wings of a proper airfoil shape.

It is understood that my device may be further modified without departing from the spirit of the invention, as set forth in the appended claims.

I claim as my invention:

1. An airplane comprising a fuselage and main wings, the wings having rounded tips; detachable extensions on the wings, the extensions having hollow sockets at the inner ends tightly fitting over the tips, the wings and the tips being of airfoil shape; coaxial screws passing through the wings and through the fuselage and having right and left threads at the ends; nuts in the extensions engaged by the screws; a coupling joining the inner ends of the screws; and means to rotate the screws for tightening or loosening the extensions on the tips.

2. An airplane comprising a fuselage and main wings; detachable extensions on the tips of the wings, the extensions having sockets at the inner ends tightly fitting over the tips, the surfaces of the extensions smoothly merging with the surfaces of the wings; coaxial screws rotatively supported in the wings having threaded ends extending to the outside of the tips; nuts in the sockets of the extensions for the outer ends of the screws; and means in the fuselage to rotate the inner ends of the screws for tightening or releasing the extensions.

VADIM S. MAKAROFF.